(12) United States Patent
Su et al.

(10) Patent No.: US 7,127,607 B1
(45) Date of Patent: Oct. 24, 2006

(54) PKI-BASED CLIENT/SERVER AUTHENTICATION

(75) Inventors: Jin Su, Orem, UT (US); Paul Hillyard, Lindon, UT (US); Alan B. Butt, Orem, UT (US)

(73) Assignee: LANDesk Software Limited, Dublin (IE)

( * ) Notice: Subject to any disclaimer, the term of this patent is extended or adjusted under 35 U.S.C. 154(b) by 0 days.

(21) Appl. No.: 10/856,450

(22) Filed: May 28, 2004

Related U.S. Application Data

(62) Division of application No. 09/608,986, filed on Jun. 30, 2000.

(51) Int. Cl.
  *H04L 9/00* (2006.01)
  *G06F 7/04* (2006.01)
  *G06F 15/16* (2006.01)
  *G06F 7/58* (2006.01)

(52) U.S. Cl. ............... 713/156; 713/170; 713/175; 726/10

(58) Field of Classification Search ............ 726/10; 713/156
  See application file for complete search history.

(56) References Cited

U.S. PATENT DOCUMENTS

| | | | |
|---|---|---|---|
| 5,657,390 A | 8/1997 | Elgamal et al. | |
| 5,812,776 A * | 9/1998 | Gifford | 709/217 |
| 5,944,824 A * | 8/1999 | He | 713/201 |
| 6,047,268 A | 4/2000 | Bartoli et al. | |
| 6,088,805 A * | 7/2000 | Davis et al. | 713/202 |
| 6,094,485 A | 7/2000 | Weinstein et al. | |
| 6,115,040 A | 9/2000 | Bladlow et al. | |
| 6,199,113 B1 | 3/2001 | Alegre et al. | |
| 6,223,284 B1 * | 4/2001 | Novoa et al. | 713/100 |
| 6,226,752 B1 * | 5/2001 | Gupta et al. | 713/201 |
| 6,247,127 B1 * | 6/2001 | Vandergeest | 713/100 |
| 6,275,934 B1 * | 8/2001 | Novicov et al. | 713/168 |
| 6,275,941 B1 * | 8/2001 | Saito et al. | 713/201 |
| 6,421,768 B1 | 7/2002 | Purpura | |
| 6,477,531 B1 * | 11/2002 | Sullivan et al. | 707/10 |
| 6,578,078 B1 * | 6/2003 | Smith et al. | 709/224 |
| 6,668,322 B1 | 12/2003 | Wood et al. | |
| 6,754,829 B1 * | 6/2004 | Butt et al. | 713/200 |
| 6,816,900 B1 | 11/2004 | Vogel et al. | |
| 2001/0051998 A1 * | 12/2001 | Henderson | 709/217 |
| 2003/0041263 A1 | 2/2003 | Devine et al. | |

OTHER PUBLICATIONS

Menezes, Alfred J. et al. Handbook of Applied Cryptography, 1997 CRC Press, pp. 39, 511, 547-551 & 559-561.*
Fielding, Roy T. et al. "Principled Design of the Modem Web Architecture", 2000 ACM.
Ford, Warwick. "Public-Key Infrastructure Interoperation", 1998 IEEE.
Kristol, D. et al. "HTTP State Management Mechanism", Feb. 1997.

(Continued)

*Primary Examiner*—Jacques H. Louis-Jacques
*Assistant Examiner*—Michael J. Simitoski
(74) *Attorney, Agent, or Firm*—Madson & Austin

(57) ABSTRACT

A client/server authentication system is disclosed. The system includes a filter, a plug-in, and an extension. The filter monitors sessions between a client and a server for proper authentication. The plug-in is coupled to the client and the server. The plug-in generates public and private key pairs, and receives and stores certificates. The extension is coupled to the filter. The extension generates script commands to cause the client and the server to perform required steps indicated by the filter.

7 Claims, 13 Drawing Sheets

OTHER PUBLICATIONS

Menezes, Alfred et al. Handbook of Applied Cryptography, 1997 CRC Press LLC., Chapter 13.

Samar, Vipin. "Single Sign-On Using Cookies for Web Application", 1999.

Schneier, Bruce. Applied Cryptography, Second Edition, 1996 John Wiley & Sons, p. 48.

Certicom. "SSL Plus Toolkit 3.0", Jun. 2000, http://web.archive.org/web/20000619053503/http://www.certicom.com/products/ssl_tool30.html.

Cox, Mark J. et al. "Apache e-Commerce Solutions", ApacheCon 2000, Jan. 2000.

\* cited by examiner

PBCSA PROTOCOL FOR INITIAL HANDSHAKE

PKI-BASED CLIENT/SERVER AUTHENTICATION

CROSS-REFERENCE TO RELATED APPLICATION

This application is a divisional of U.S. patent application Ser. No. 09/608,986 entitled PKI-Based Client/Server Authentication," filed Jun. 30, 2000.

BACKGROUND

This disclosure relates to public-key infrastructure (PKI)-based client/server authentication.

The expanding popularity of the Internet, especially the World Wide Web, has lured many people and businesses into the realm of network communications. There has been a corresponding growth in the transmission of confidential information over these networks. As a consequence, there is an increasing need for security in communications over the Internet. In particular, there is a critical need for improved approaches to ensuring the confidentiality of private information.

Many operating systems, including UNIX and Microsoft Windows™, support a security protocol implemented through a Secure Sockets Layer (SSL) library. In these systems, the SSL provides authentication and data privacy over the Internet. However, SSL implementation has some disadvantages. The SSL 1.0 provides server authentication but not client authentication. The SSL 3.0 provides mechanisms for client authentication but requires storage and management of client certificates.

For example, Web browsers that support the SSL 3.0 warn the user of connecting to a site with an unlisted certificate. An unlisted certificate site refers to a site with a certificate signed by a certificate authority not in the authority trust list such as CyberTrust or VeriSign. In this case, the browser requires the user's certificate to be placed into the client certificate list. The browser further requires the selection of this certificate every time a connection is made to the web server.

Public-key infrastructure (PKI) is a combination of software, encryption technologies, and services that provides security for communications and business transactions over public and private networks. The PKI technology provides several aspects of security needs such as authentication, privacy, data integrity, and non-repudiation.

BRIEF DESCRIPTION OF THE DRAWINGS

Different aspects of the disclosure will be described in reference to the accompanying drawings wherein.

DETAILED DESCRIPTION

Throughout this description, the embodiments and examples shown should be considered as examples rather than as limitations of the invention.

Figure 1:
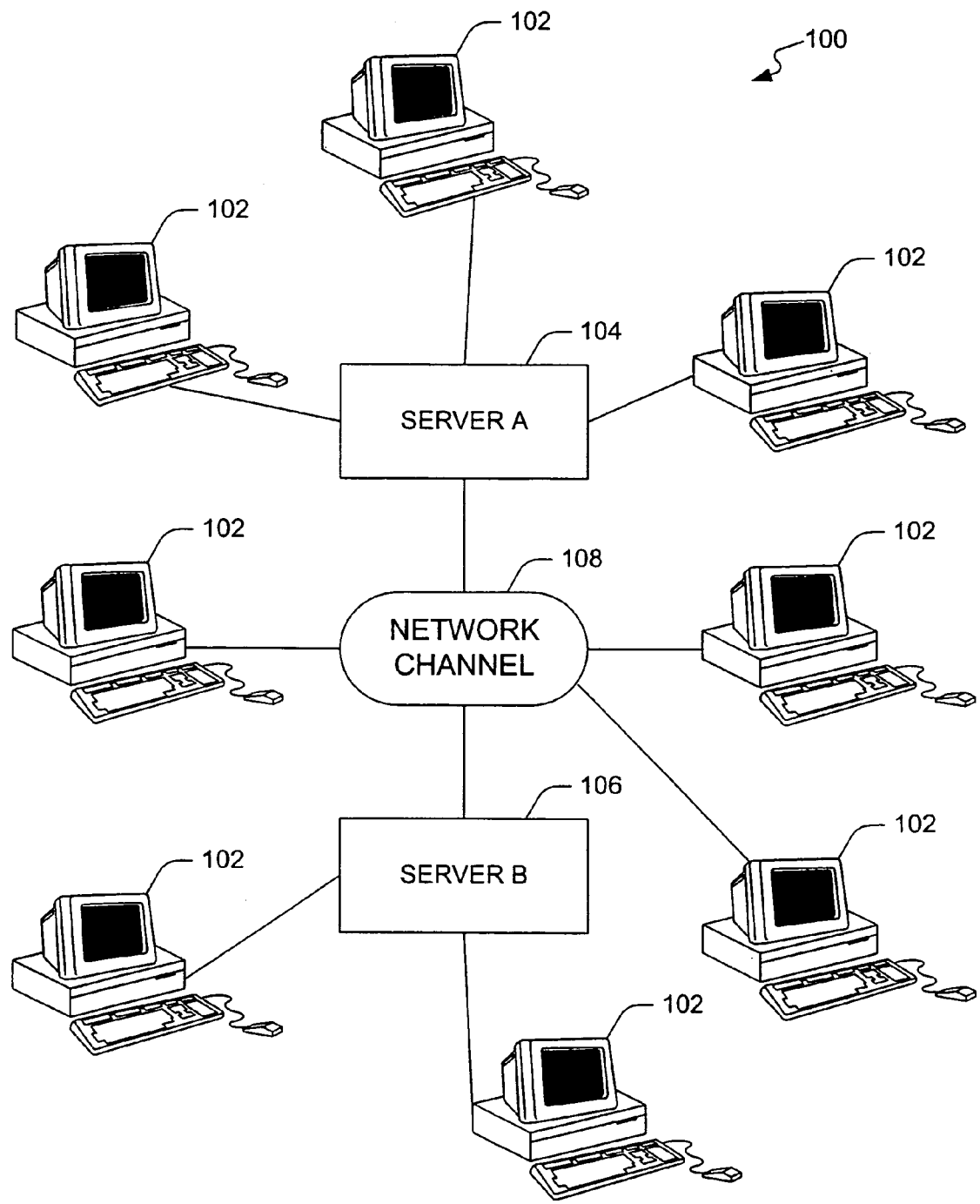
FIG. 1 shows an examplary computer network in accordance with an embodiment of the present invention.

An examplary computer network 100, such as the Internet, is illustrated in FIG. 1 in accordance with an embodiment of the present invention. The computer network 100 includes computers 102, 104, 106. The computers 102 may be "personal computers" or workstations. These computers 102 may enable users to make requests for data or services from other computers on the network 100. The requested data may reside in the computers 102, 104, 106. The computer network 100 also includes a network channel 108, which allows the delivery of the requested data or service between the computers 102, 104, 106.

In some embodiments, the computers 102 are client systems and the computers 104, 106 are servers. The term "client" refers to a computer's general role as a requester of data or services, and the term "server" refers to a computer's role as a provider of data or services. The size of a computer, in terms of its storage capacity and processing capability, does not necessarily affect its ability to act as a client or server. Further, it is possible that a computer may request data or services in one transaction and provide data or services in another transaction, thus changing its role from client to server or vice versa.

In other embodiments, the computers 102 may also act as consoles to provide system administrators with access to managed nodes. The managed nodes may be represented with any computers 102, 104, 106 tied to the network channel 108. In these embodiments, the consoles and the managed nodes may have associated servers to store related data. There may also be a central service and database server referred to as a core. The core may be used to store and manage data. The core may also be used to provide authentication and issue certificates. The console, the managed nodes, and the core may form a system such as Intel's LANDesk product.

The system described above may also require Single Sign-On (SSO) for the system administrator. Once the administrator logs into the core through the console, the SSO allows the administrator free access to the managed nodes in the system. The administrator is allowed to access the resources and administrative features of the system without requiring additional authentication processes at the core or the managed nodes. Thus, the authentication at the core is propagated to the managed nodes.

The console in the system may use a Web browser or a WinINET-based User Interface (UI) component, such as Microsoft Management Console (MMC), to interface with the network. The managed node may use the Web server to communicate to the network.

In the above embodiments, the system uses a PKI-based technology. The console performs network operating system (NOS) authentication at the core computer using the capabilities of the core's web server. Once the operating system has been authenticated, the console may create a public/private key pair and submit the public key to the core. The core may create an X.509 compliant certificate using the public key, and place identification information in the certificate based upon the NOS authenticated console session. Managed nodes have the core's signing certificate containing the core's public key. Therefore, the nodes may be configured to trust certificates signed by the core. When a managed node is contacted, the console may present the certificate to the managed node. The node may use the public key of the core to verify the certificate that identifies the operator/administrator. Further, the managed node may use the information embedded in the certificate to grant specific access rights to the console operator.

Figure 2:
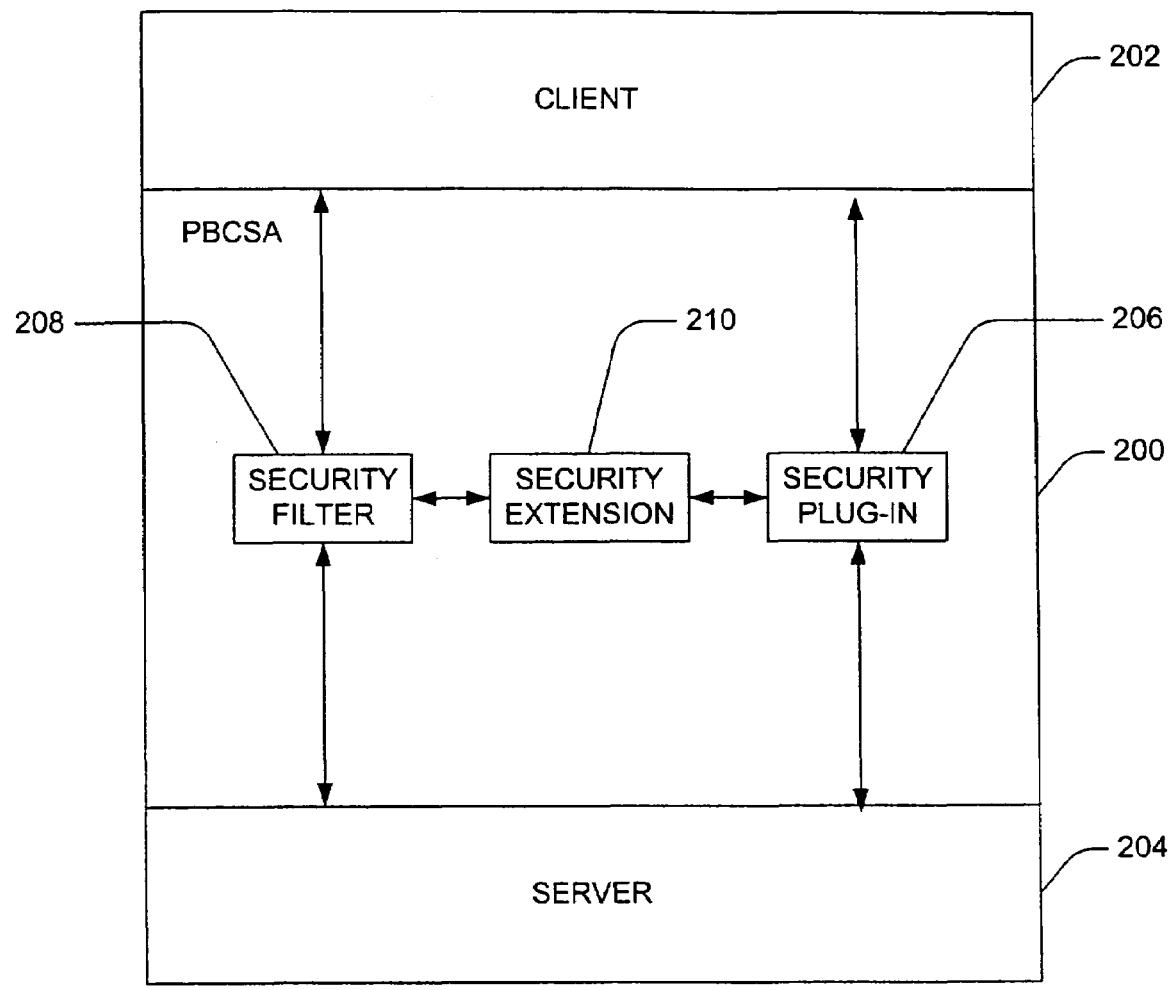
FIG. 2 is a block diagram of a PKI-based client/server authentication (PBCSA) system in accordance with an embodiment of the present invention.

A PKI-based client/server authentication (PBCSA) system utilizes the Web server's extension functionality and the Web browser's script capabilities to implement the PBCSA protocol. A block diagram of the PBCSA system 200 is illustrated in FIG. 2 in accordance with an embodiment of the present invention. The diagram includes the PBCSA system 200 in the context of a relationship between a client 202 and a server 204. In one embodiment, the PBCSA system includes a security plug-in 206, a web server security filter 208, and a web server security extension 210.

The web server security filter 208 monitors sessions for proper authentication. The security filter 208 may also re-direct unauthenticated sessions to the proper web page.

The security plug-in 206 interfaces a client script to generate public/private key pairs. The security plug-in 206 may also receive and store certificates from the core. The security plug-in 206 may further generate client signatures.

The web server security extension 210 generates an HTML and browser script commands to cause the client 202 to perform the required steps.

Figure 3A:
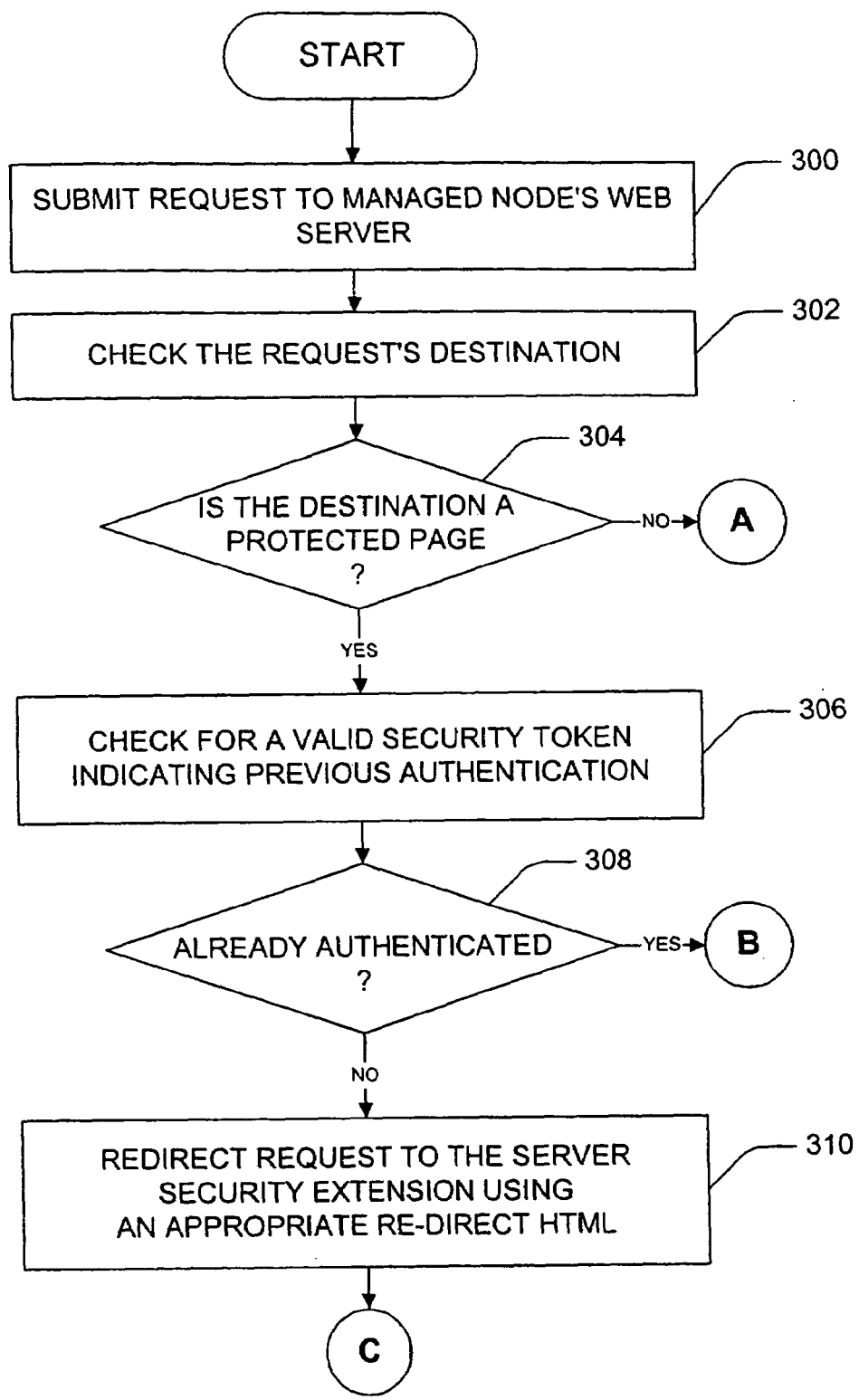
FIGS. 3A through 3C show an authorization process according to an embodiment of the present invention.
Figure 3B:
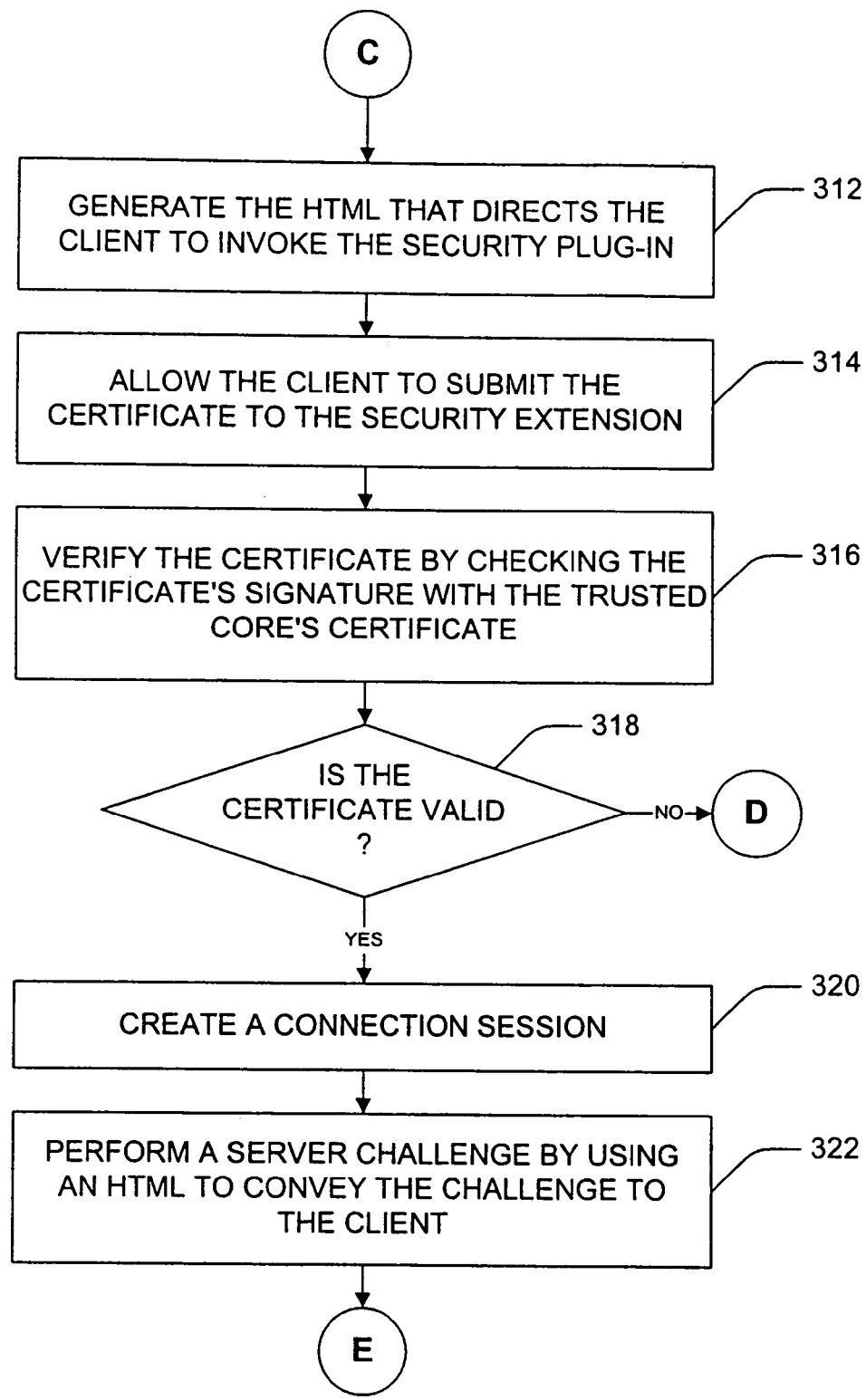
Figure 3C:
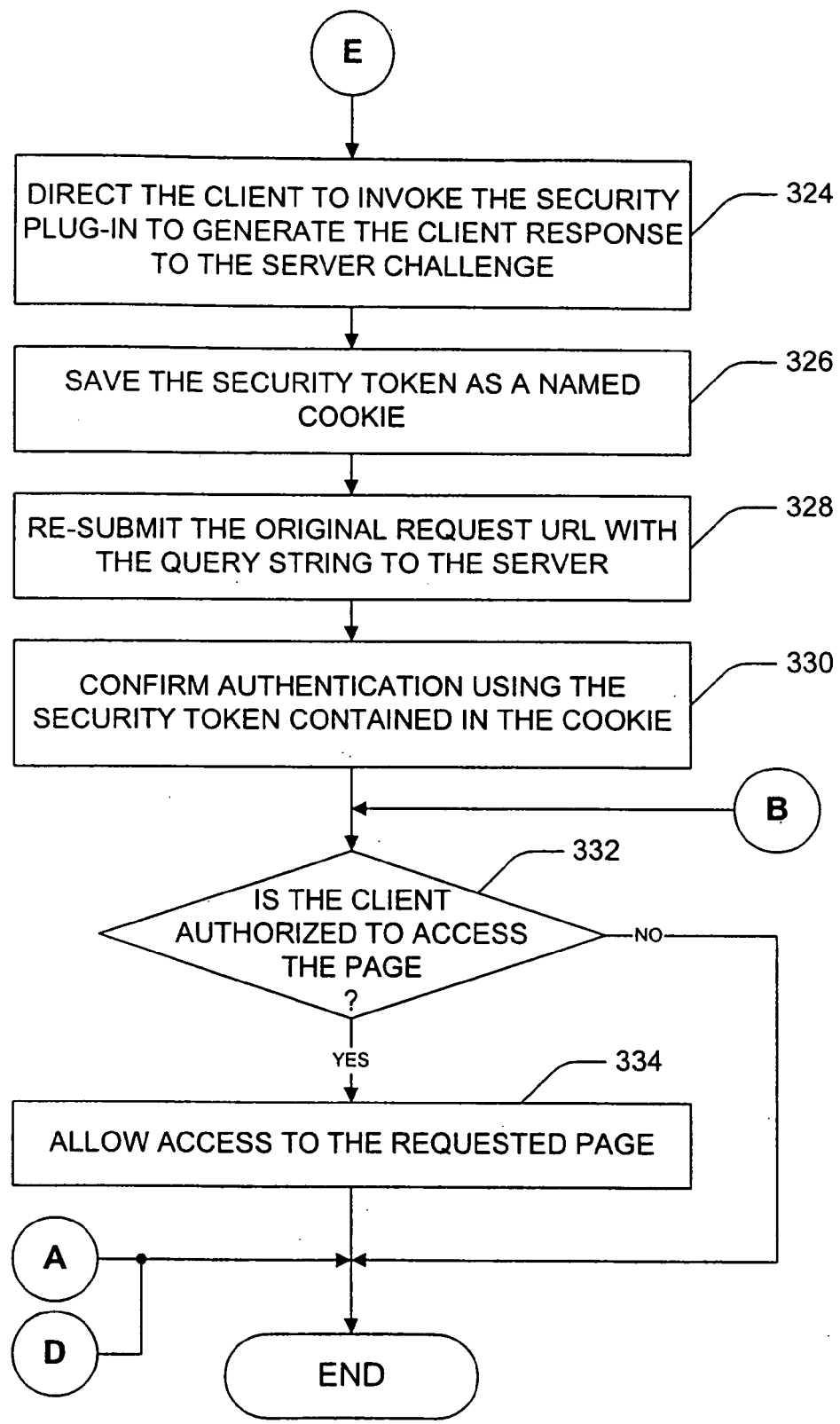

FIGS. 3A through 3C show a flowchart of an authorization process according to an embodiment of the present invention. The authorization process includes a console authentication and a client authorization.

Initially, a client side console submits a request to a managed node's web server at 300. The security filter 208 checks the request's destination at 302. If the destination is a protected page 304, the security filter 208 may examine the request to look for a valid security token at 306. The presence of the token may indicate a previous authentication by the console. If the valid security token is not present to indicate a previous authentication 308, then the security filter 208 may re-direct the request to the security extension 210 of the managed node's web server at 310. In one embodiment, the re-direction is effected by an appropriate HTML program.

At 312, the security filter 208 may generate an appropriate re-direct HTML program and script to direct the client to invoke the security plug-in 206. The invocation of the security plug-in 206 allows the client to submit the certificate to the security extension at 314. The security extension 210 may then verify the certificate by checking the certificate's signature with the trusted core's certificate at 316. If the certificate is determined to be valid 318, the security extension 210 creates a connection session at 320. The security extension 210 may then perform a server challenge at 322. In one embodiment, the server challenge may be made by using the re-direct HTML program to convey the challenge to the client. The re-direct HTML program may direct the client to invoke the security plug-in 206 to generate the client response to the server challenge at 324.

The purpose of the server challenge and the client response is to prevent an intruder from intercepting the client certificate and then submitting the certificate to the server. In one embodiment, the server challenge is a random number. The client may respond to the server challenge by signing the random number with a private key associated with the session certificate. By verifying that the client has the private key, the server knows that the client is not an eavesdropper. An eavesdropper may obtain the certificate by listening to network traffic, but he has no access to the private key since the key is not sent over the network.

The re-direct HTML program may direct the client to save the security token as a named cookie at 326. At 328, the client is directed to re-submit the Uniform Resource Locator (URL) of the originally requested page, along with a query string to the server. Once this process is completed, the security filter 208 determines if the session is authenticated. The determination is made using the security token contained in the cookie at 330.

Once the session is authenticated, the security filter 208 determines if the client is authorized to access the web page at 332. If authorized, the client is allowed access to the requested page at 334.

Figure 4:
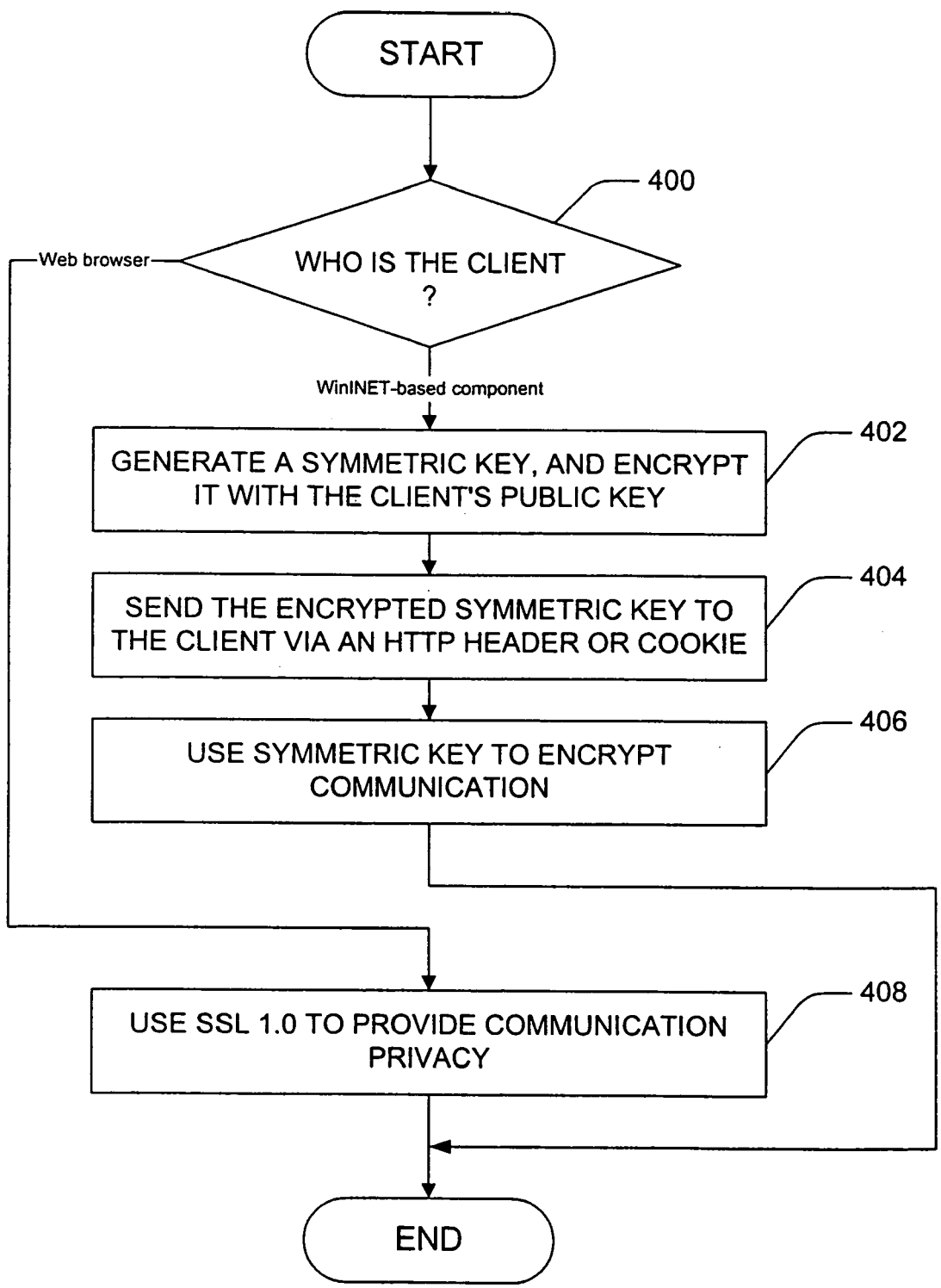
FIG. 4 is a flowchart of a process to build communication privacy according to an embodiment of the present invention.

FIG. 4 shows a flowchart of a process to build data communication privacy according to an embodiment of the present invention. A determination of the identity of the PBCSA client is made at 400.

If the client is a WinINET-based component, the security filter 208 may generate a symmetric key and encrypt the key with the client's public key at 402. The filter may then send the encrypted symmetric key to the client via an hypertext transfer protocol (HTTP) header or cookie at 404. The symmetric key may be used to encrypt communication at 406. If the client is a web browser, the PBCSA system may work with Secure Sockets Layer (SSL) library 1.0 to provide communication privacy at 408.

The combination of SSL 1.0 and the PBCSA system allows flexibility of an extensive client/server authentication without added responsibility of certificate selection and management. The combined system provides advantageous features of communication authentication and privacy at significantly reduced storage and management tasks for the client. The footprint of the server side component is smaller than that of a fully enable SSL 3.0 server. The PBCSA system may also provide authentication to non-SSL supported Web servers. Further, the PBCSA system may enable core-based authorizations.

Figure 5A:
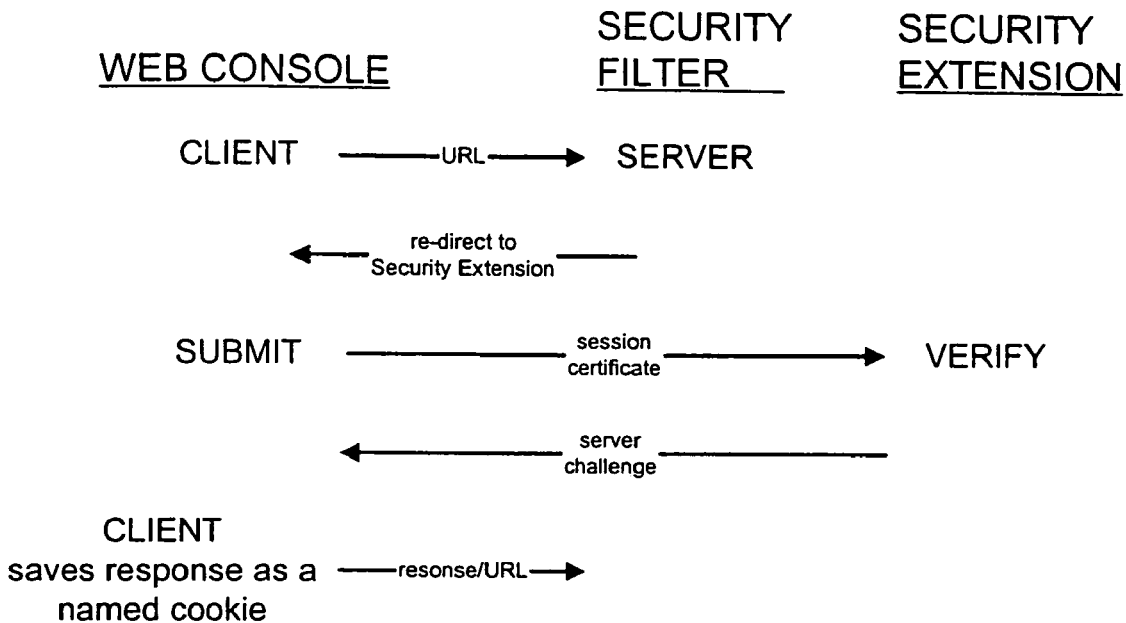
FIG. 5A shows one example of a PBCSA initial handshake protocol for a Web browser client.
Figure 5B:
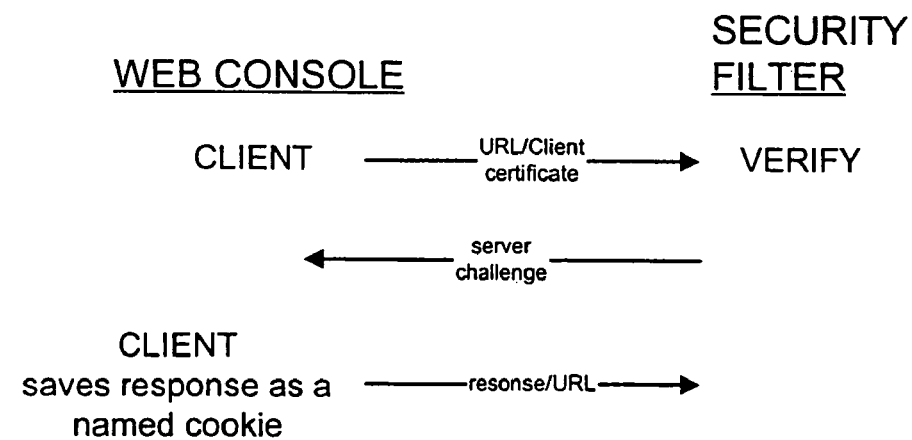
FIG. 5B shows one example of a PBCSA initial handshake protocol for a WinINET-based component client.
Figure 6A:
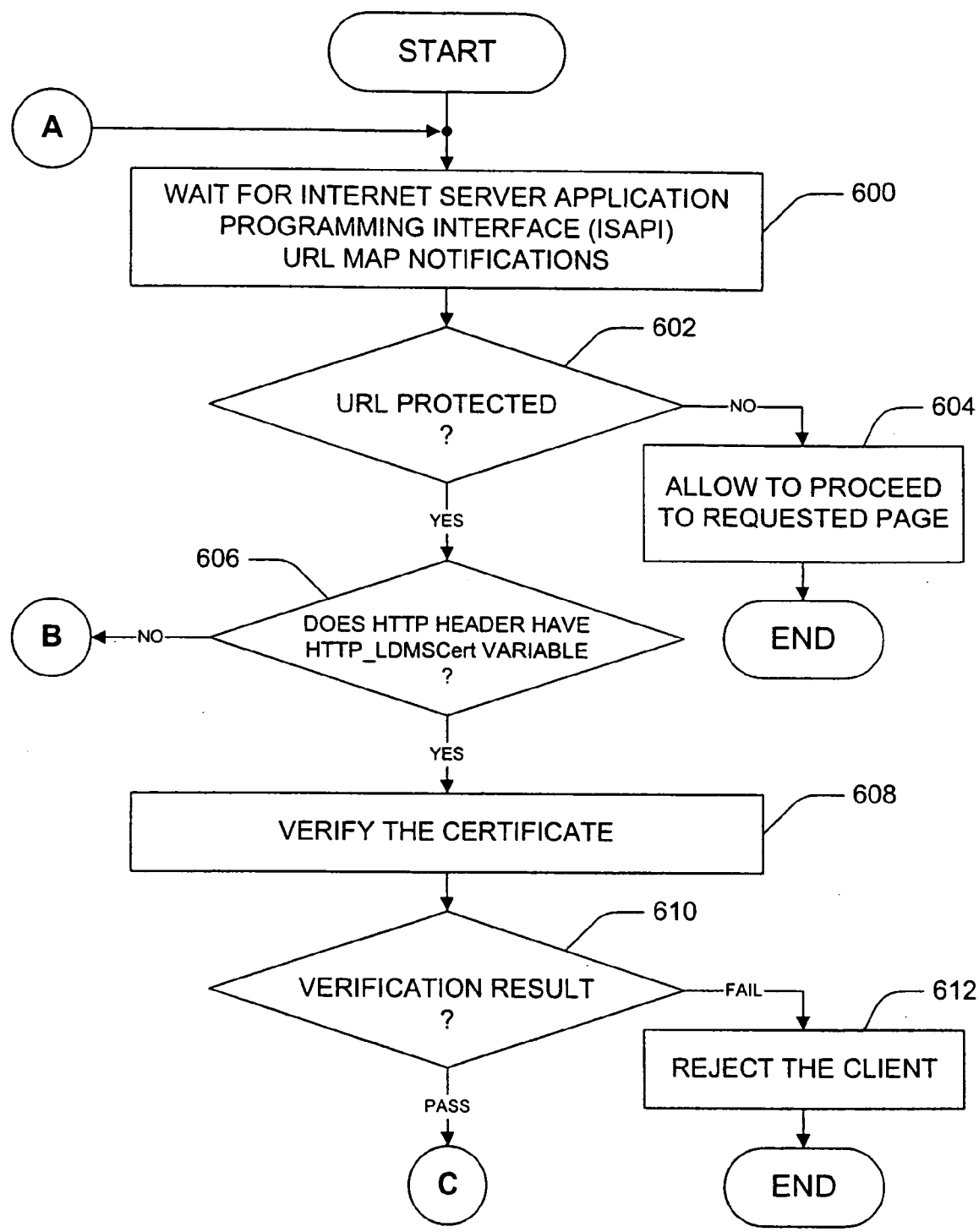
FIGS. 6A through 6E show a detailed example technique for a security filter in accordance with an embodiment of the present invention.
Figure 6B:
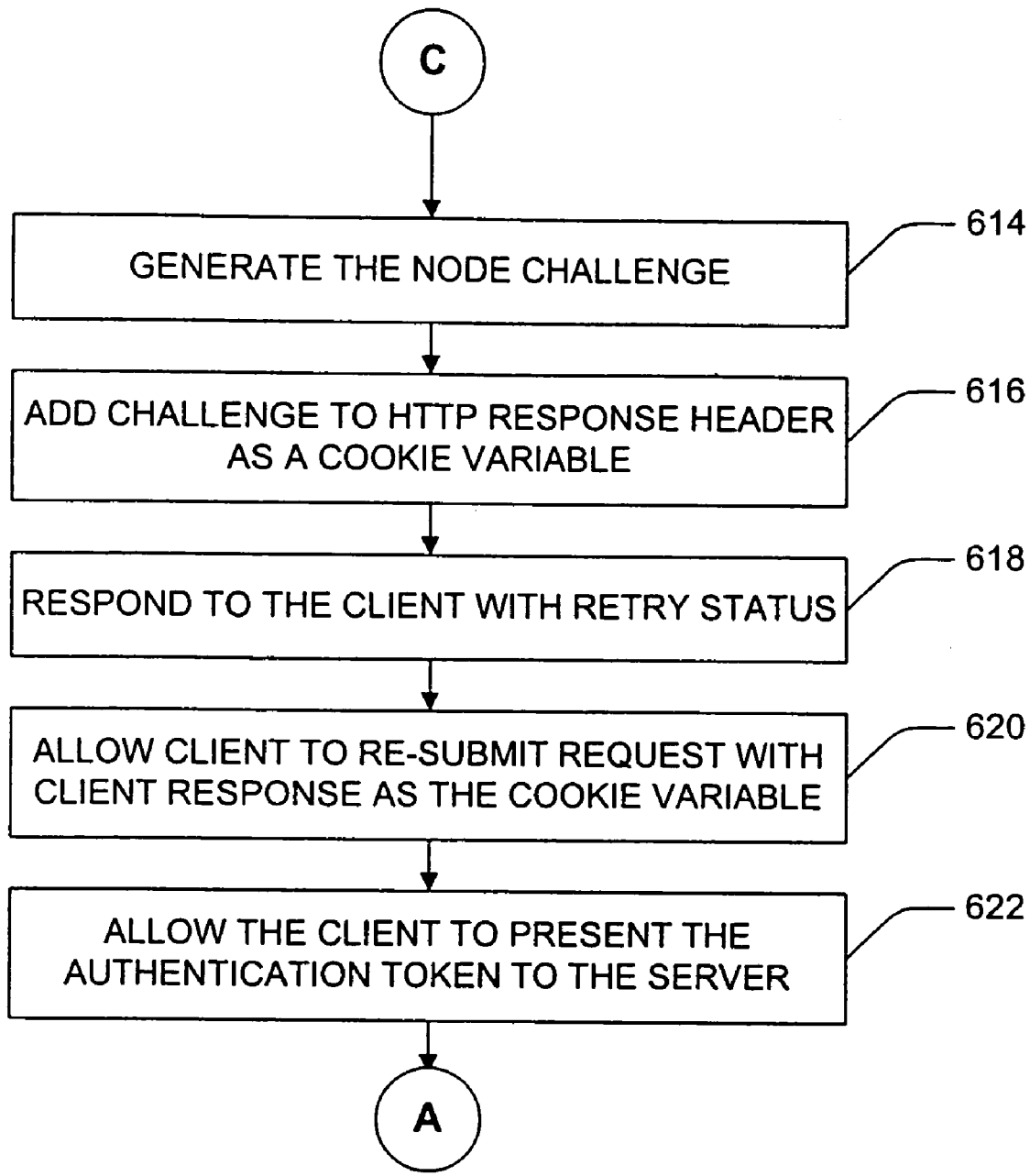
Figure 6C:
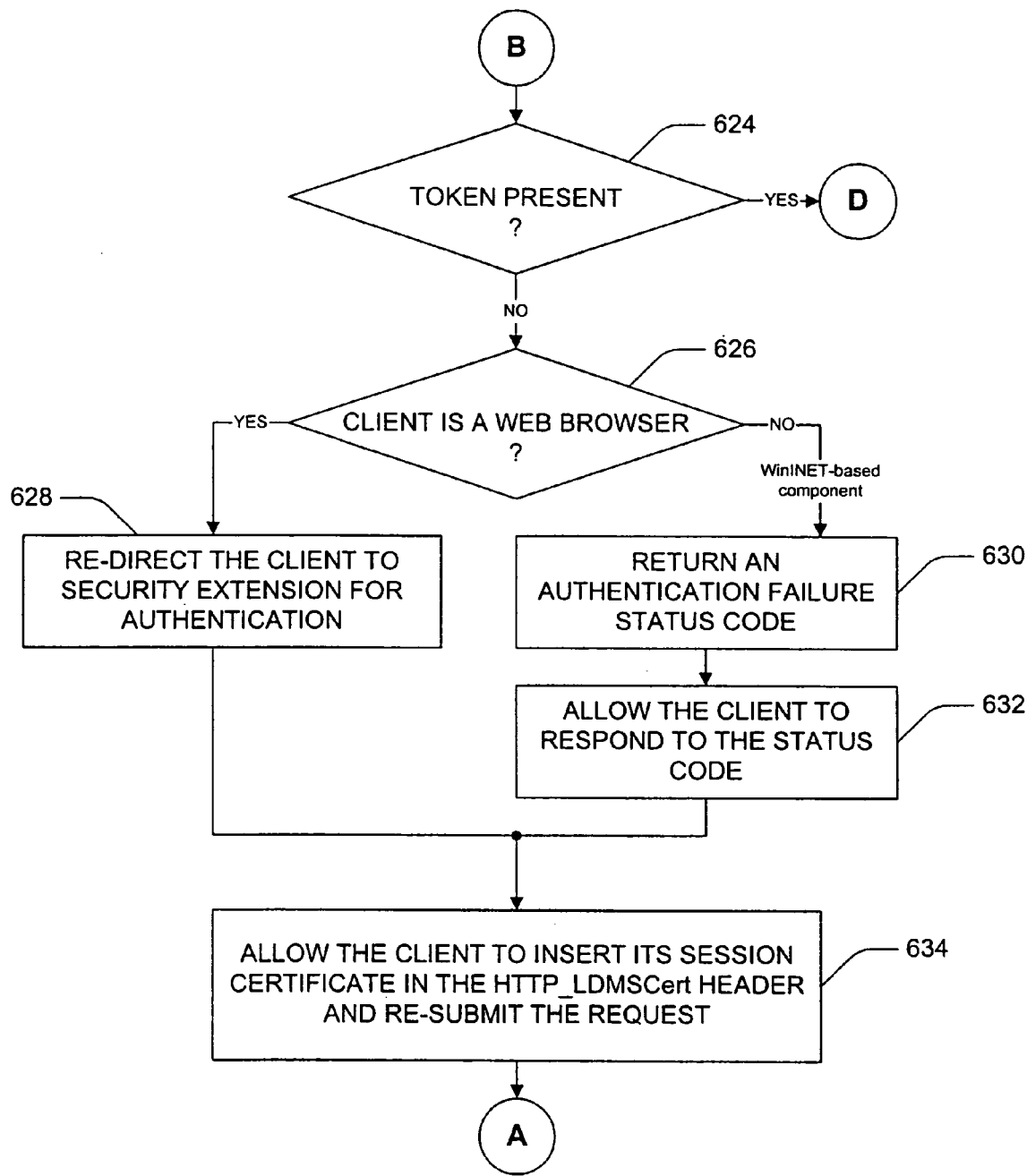
Figure 6D:
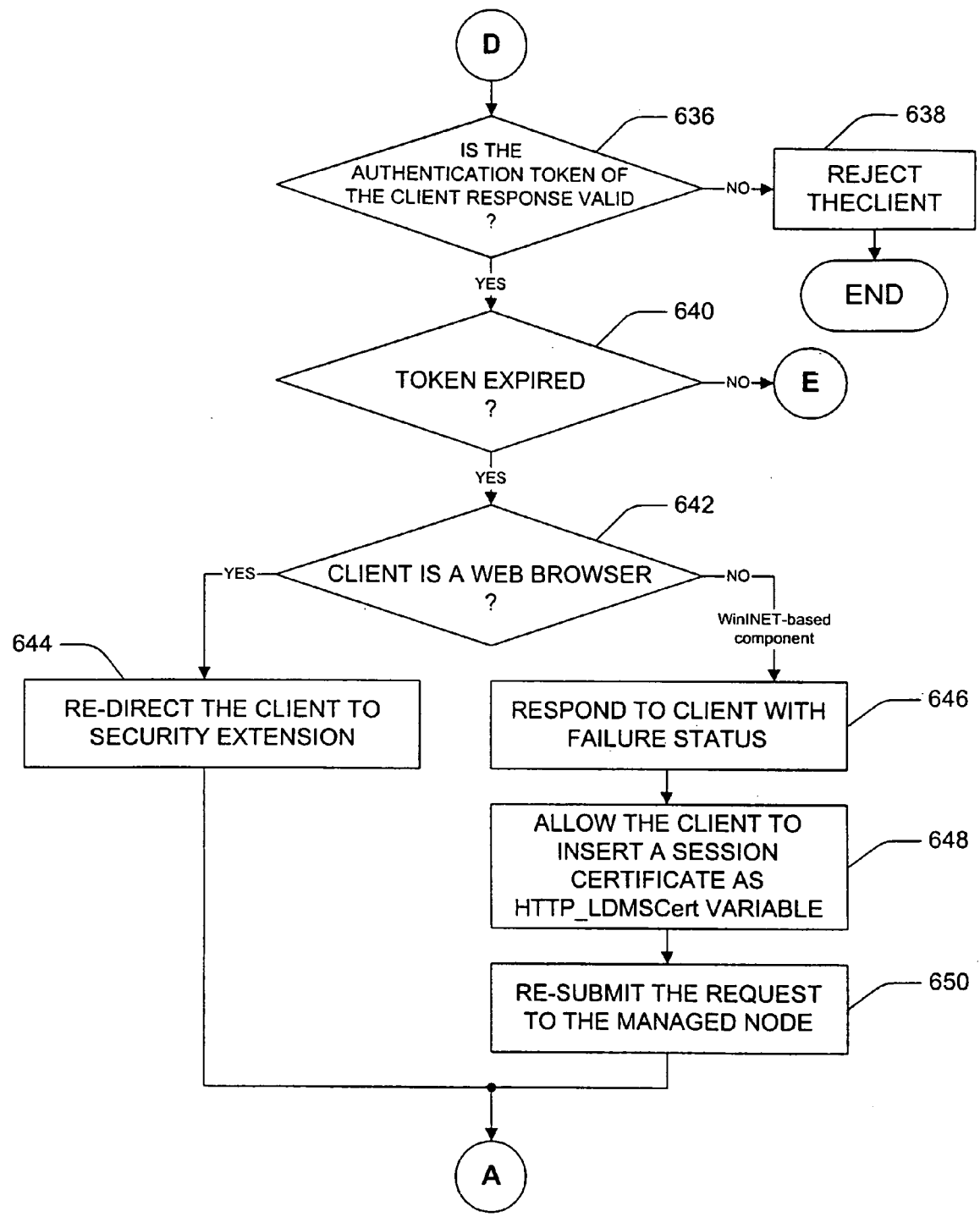
Figure 6E:
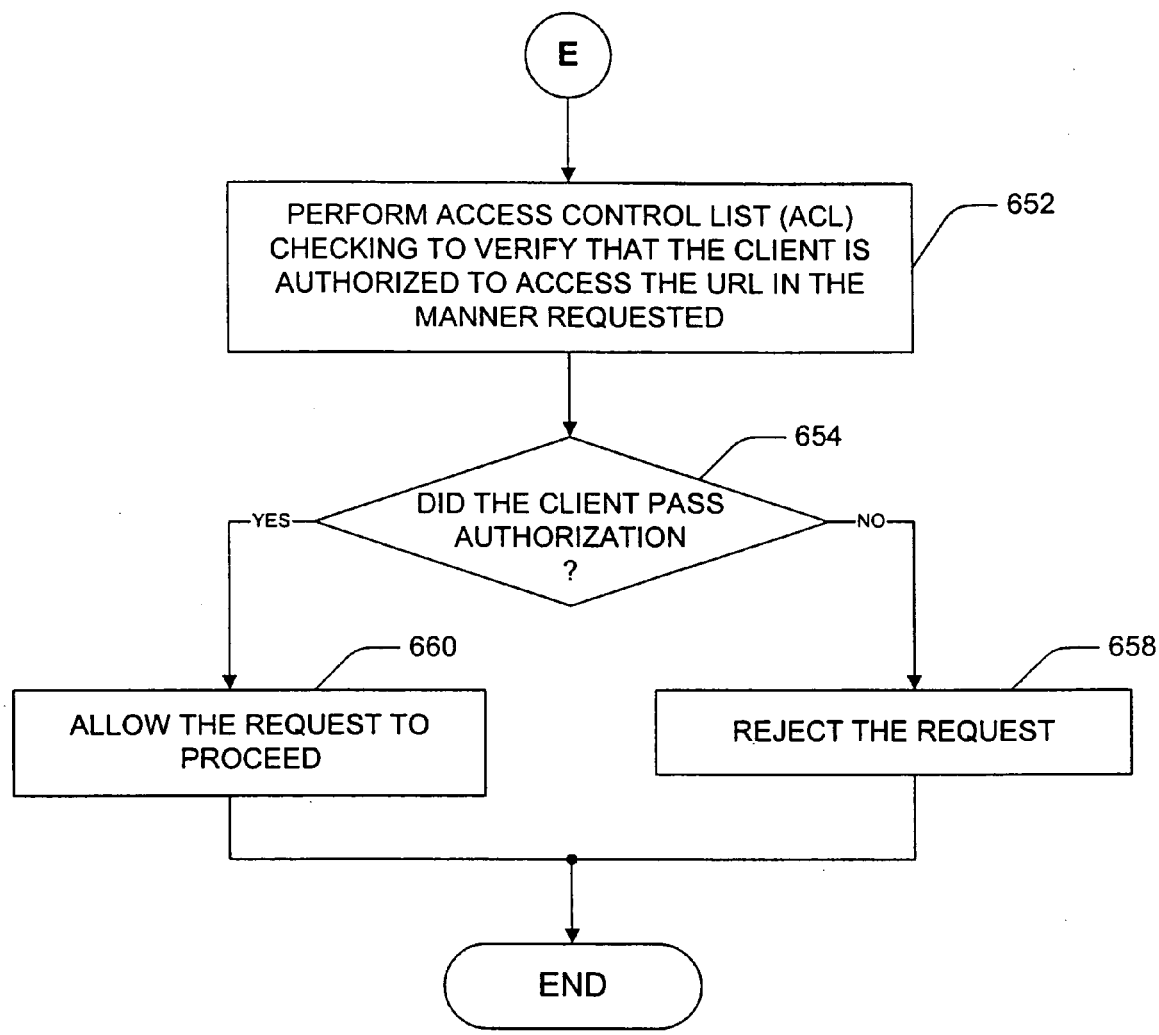

FIGS. 5A and 5B show examples of a PBCSA initial handshake protocol. The handshake for a Web browser client (FIG. 5A) may start with the client first contacting the server with a request to an URL of the server. The security filter 208 then redirects the request to the security extension 210. The client may submit the session certificate to the security extension 210. The security extension 210 then verifies the certificate and generates a server challenge. The security extension 210 redirects the client to its original URL. The client may then generate the client response and save the response as a named cookie.

For a WinINET-based component (FIG. 5B), the client first contacts the server with the certificate inserted as a request header. The security filter 208 may verify and generate the server challenge that is inserted in the response header. The client may then generate the client response and save it as a named cookie.

FIGS. 6A through 6E show a detailed example technique for the security filter 208. The duty of the security filter 208 is to protect certain areas (e.g. Web pages) on the server by blocking unauthenticated or unauthorized client accesses.

The security filter 208 waits for Internet Server Application Programming Interface (ISAPI) Uniform Resource Locator (URL) map notifications at 600. The filter may then check if the URL is protected 602. If the URL is not protected, the request is allowed to proceed at 604. If the URL is protected, the filter may check the HTTP header at 606.

If the HTTP header has a HTTP_LDMSCert variable, then the client is a non-browser client who submitted the certificate in the request header. The HTTP_LDMSCert variable inserts the client certificate into the HTTP header.

The variable also informs the web server that the connection is made by a WinINET-based client. When the security filter 208 finds this variable in the HTTP header, the filter assumes that the connection is a new WinINET connection. The filter further expects the authentication to take place within the security filter 208. Thus, in this case, the security filter 208 does not need to redirect the client to submit the certificate to the security extension 210. This saves a round trip between the web server and the client.

The security filter 208 may then perform the verification of the certificate at 608. If the verification of the certificate 610 fails, the filter may reject the client at 612. If the verification succeeds, the filter may generate the node challenge 614 and add the challenge to the HTTP response header as a cookie variable at 616. The security filter 208 may respond to the client with a retry status at 618. The client may re-submit the request with the client response as the cookie variable instead of the certificate variable in the requested header at 620. The re-submission of the request allows the client to present the authentication token to the server at 622. The security filter 208 may then create and register the session, and re-direct the client to the original URL.

If the HTTP header does not have the HTTP_LDMSCert variable, then a check is made to find out if the client has presented an authentication token as a cookie variable at 624. If the token is not present and the client is a Web browser 626, the security filter 208 may redirect the client to the security extension 210 for authentication at 628. If the client is not a browser, the filter may return an authentication failure status code at 630. The non-browser client automatically responds to this status code at 632. The client may then insert its session certificate in the HTTP_LDMSCert header and resubmit the request at 634.

If the authentication token is present, the filter may verify that the authentication token of the client response is valid at 636. The security filter 208 may then reject the client's access at 638 if the response is not valid. Otherwise, if the response is valid, the filter may verify that the authentication token has not expired at 640. If the token has expired, the filter may redirect the browser client 642 to the security extension at 644. For a non-browser client, the filter may respond to the client with a failure status at 646. The client may insert a session certificate as the HTTP_LDMSCert variable, at 648, and resubmit the request to the managed node upon receipt of the failure status at 650.

At 652, Access Control List (ACL) checking is performed to verify that the client is authorized to access the URL in the manner requested. If the client passes the authorization process 654, the client is allowed to proceed to the requested page at 656. Otherwise, the request is rejected at 658.

Figure 7:
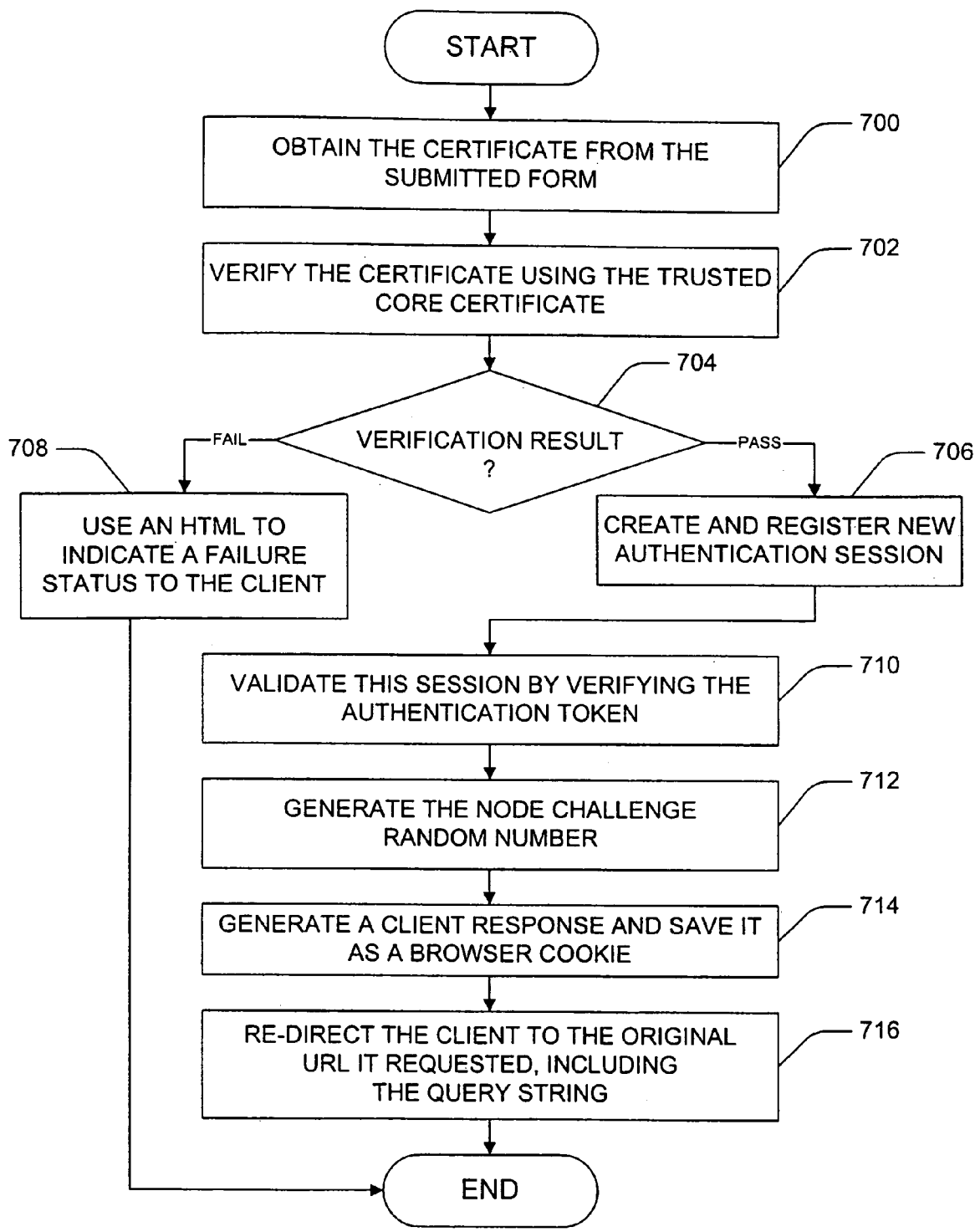
FIG. 7 is a detailed example technique for a security extension in accordance with an embodiment of the present invention.

FIG. 7 is a detailed example technique for the security extension 210. The duty of the security extension 210 is to obtain and verify the client's certificate when the client is a Web browser. The security extension 210 may then redirect the client to its original URL.

The security extension 210 may obtain the certificate from the submitted form at 700. The extension 210 then verifies the certificate using the trusted core certificate at 702. If the verification fails at 704, the security extension 210 indicates a failure status to the client using an HTML program at 708. If the verification passes at 704, the security extension 210 creates and registers a new authenticated session at 706. The filter may then validate this authenticated session by verifying the authentication token at 710.

The security extension 210 may generate a node challenge random number at 712. The extension 210 may also generate the re-direct HTML program. The program may generate the client response and save the response as a browser cookie at 714, and re-direct the client to the original URL it requested at 716. The browser cookie may be saved to expire after the current session. The Web browser or WinINET component may automatically send the client response as a cookie variable in subsequent requests to the server.

The Web browser may use the re-direct HTML program to redirect the browser from its requested target to the security extension 210 and from the extension 210 back to the original target during the authentication process.

An example HTML code for the re-direct program is listed below. The following code segment contains HTML redirection scripts to redirect the client. The code contains the server challenge that may direct the client to invoke the security plug-in 206. The invocation of the security plug-in 206 calculates the client response. The code then saves the client response as a named cookie. The browser automatically submits the authentication token as the cookie variable in the HTTP header in subsequent requests made to the server. The HTML script then redirects the client to the URL of the original request with the query string. The original request is automatically re-submitted to the server with the client response after the authentication process. The code shown below may be found in the security filter 208.

```
strcpy(raw,
    "<HTML>\r\n<BODY>Authentication in processing . . . <br>\n"
    "<OBJECT classid=CLSID:B)!B133E-E148-11D2-8757-00C004F72C180 height=1 id=SecCon
    width=1></OBJECT>\n"
    "<form name=\"CertData\" action=\"//jsu-deski1/MNode/idms.sec?CertVerify\"
    method=\"post\">\n"
    "<input type=\"hidden\" name=\"CertVerify\" value=\"\" >\n"
    "<input type=\"hidden\" name=\"RedirectUrl\" value=\" ");
strcat(raw, url);
strcat(raw, "\">\n<input typ=\"hidden\" name=\"RedirectParam\" value=\"\">\n <form>"
    "<script language=\"vbscript\">\n"
    "cert = SecCon.GetCert\n"
    "document.CertData.CertVerify.value = cert\n"
    "document.CertData.submit( ) </script\n"
    "</BODY>\r\n</HTML>\r\n\r\n");
len = strlen(raw);
pCtxt ->WriteClient(pCtxt, raw, &len, 0);
```

The following code segment enables client to re-submit the request with the security token. The code shown below may be found in the security extension 210.

```
STR64FromData(&digest, pSession->rdmDigest);
_tcscpy(raw, _T("<OBJECT classid=CLSID:B)!B133E-E148-11D2-8757-00C004F72C180
                    height=1 id=SecCon width=1></OBJECT>\n")
               _T("<script language=\"vbscript\">\n")
               _T("cipherText = SectCon.GetSignedData(\" "));
_tcscat(raw, digest);
_tcscat(raw, _T("\")\ndocument,cookie = \AuthenBlock=KEY="));
_tcscat(raw, sessionKey);
_tcscat(raw, _T("&CHALLENGE=\" + cipherText + \";path=/\" </script>\n"));
if (url)
{
_tcscat(raw, _T("<META HTTP-EQUIV=\"REFRESH\" Conten=\"0; URL="));
_tcscat(raw, url);
    if (param)
    {
        _tcscat(raw, _T("?"));
        _tcscat(raw, param);
    }
    _tcscat(raw, _T("\">"));
}
DWORD len = _tcslen(raw) * sizeof(TCHAR);
pCtxt -> WriteClient(pCtxt->ConnID, raw, &len HSE_IO_SYNC);
```

In some embodiments, an authentication connection may be validated each time the client sends a request to the server. After initial authentication, the client may generate the client response from the server challenge. The response may be sent to the server as a part of security token for connected session validation. In this case, it may be possible for an eavesdropper to get the authentication token by listening to network traffic. The eavesdropper may send requests using the intercepted token.

To prevent this type of attack, the security filter 208 may generate the server challenge for each request inserting it into the server response header. The security token would then be valid for only one request to the server.

While specific embodiments of the invention have been illustrated and described, other embodiments and variations are possible. For example, even though the present PKI-based client/server authentication system has been described in terms of client-to-server authentication, the system may be used to perform server-to-client authentication as well.

All these are intended to be encompassed by the following claims.

What is claimed is:

1. An authentication system, comprising:
    a security filter to monitor sessions between a client and a server for proper authentication, to search for a security token sent from the client to the server, wherein the security token, if present, is stored on the client as a cookie, and to direct the client to submit a certificate to the server;
    a plug-in coupled to the client and the server, said plug-in to generate public and private key pairs, and to receive and store certificates; and
    security extension coupled to said filter, said extension to verify the submitted certificate sent from the client to the server, to generate script commands to cause the client and the server to perform required operations indicated by said security filter, wherein the extension is configured to generate a node challenge random number; and
    to cause the client to generate a response to the node challenge random number, to send the response to the server, and to save the response as a named cookie on the client.

2. The system of claim 1, wherein the certificates are used to certify the client to the server.

3. The system of claim 1, wherein the certificates are used to certify the server to the client.

4. The system of claim 1, wherein the certificates are used to certify the client and the server to each other.

5. The system of claim 1, wherein the script commands are implemented in a hypertext markup language (HTML) program.

6. A secure client/server system, comprising:
    a client to request data or service;
    a server to provide the requested data or service; and
    an authentication system including:
        a security filter to monitor sessions between the client and the server for proper authentication, to search for a security token sent from the client to the server, wherein the security token, if present, is stored on the client as a cookie, and to direct the client to submit a certificate to the server,
        a plug-in coupled to the client and the server, said plug-in to generate public and private key pairs, and to receive and store certificates, and
        security extension coupled to said filter, said extension to verify the submitted certificates sent from the client to the server, to generate script commands to cause the client and the server to perform required steps indicated by said security filter, wherein the extension is configured to generate a node challenge random number, and
        to cause the client to generate a response to the node challenge random number, to send the response to the server, and to save the response as a named cookie on the client.

7. The system of claim 6, wherein the certificates are used to certify the client to the server.

* * * * *

UNITED STATES PATENT AND TRADEMARK OFFICE
CERTIFICATE OF CORRECTION

PATENT NO. : 7,127,607 B1 Page 1 of 1
APPLICATION NO. : 10/856450
DATED : October 24, 2006
INVENTOR(S) : Jin Su et al.

It is certified that error appears in the above-identified patent and that said Letters Patent is hereby corrected as shown below:

In Column 7, line 56, please replace "security extension" with --a security extension--.
In Column 8, line 50, please replace "security extension" with --a security extension--.

Signed and Sealed this

Fifteenth Day of May, 2007

JON W. DUDAS
*Director of the United States Patent and Trademark Office*